June 24, 1924.
H. B. SMITH
ROAD GRIPPING DEVICE
Filed June 9, 1923
1,499,036
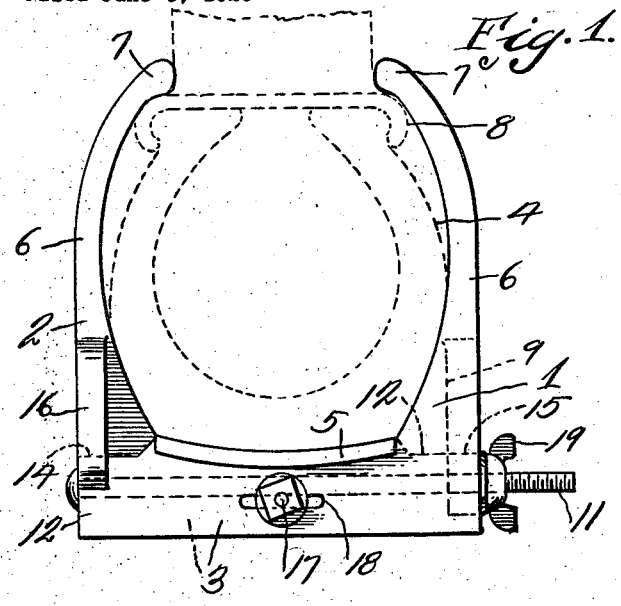
Fig.1.
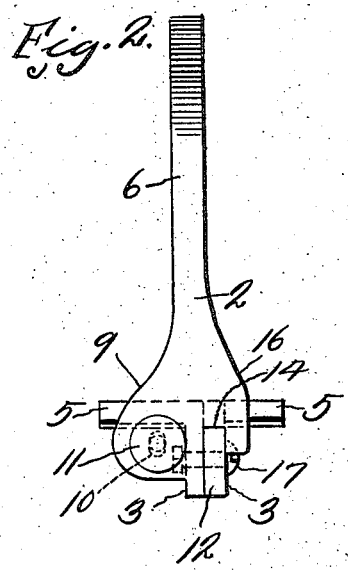
Fig.2.
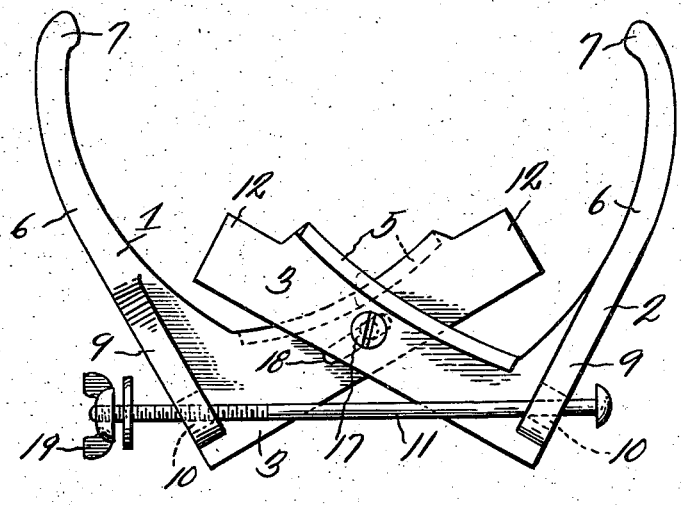
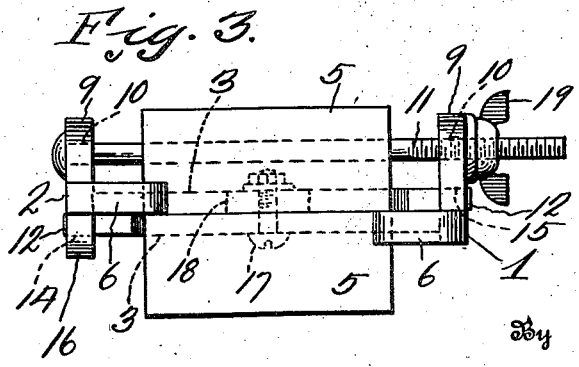
Fig.3.
Fig.4.
Inventor
Henry B. Smith
By George J. Ptsch
Attorney Patented June 24, 1924.

1,499,036

UNITED STATES PATENT OFFICE.

HENRY B. SMITH, OF SOUTH BEND, INDIANA, ASSIGNOR OF ONE-HALF TO JULIAN E. WEED, OF SOUTH BEND, INDIANA.

ROAD-GRIPPING DEVICE.

Application filed June 9, 1923. Serial No. 644,313.

*To all whom it may concern:*

Be it known that I, HENRY B. SMITH, a citizen of the United States, residing at South Bend, in the county of St. Joseph and State of Indiana, have invented certain new and useful Improvements in Road-Gripping Devices, of which the following is a specification.

The invention relates to road gripping devices and has for its object to provide a device of this character which may be easily and quickly attached to one of the drive wheels of an automobile, whereby traction may be obtained in sand or mud by preventing the wheel, furnishing the driving power, from spinning.

A further object is to provide a road gripping device for automobiles, said device comprising a pair of substantially L-shaped members, one of the arms of each of said members overlapping each other and adapted to engage the tread of an automobile tire and provided with slot and bolt connections whereby said overlapped arms may be moved transversely and their ends moved to positions beneath lugs. The other arms of the L-shaped members extend inwardly in relation to the wheel and engage over the inner side of the demountable rim, the device as a whole yielding with the tire.

A further object is to provide a transversely disposed bolt connecting the L-shaped members whereby said members may be forced towards each other for inter-engagement.

A further object is to provide the overlapped members with outwardly extending tread engaging plates, which when the overlapped members are in registration register with each other, thereby forming a wide tread surface for engaging the tread of the tire.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a front elevation of the road gripping device, showing the same applied to a conventional form of tire.

Figure 2 is a side elevation of the device.

Figure 3 is an inner plan view of the device.

Figure 4 is a view in elevation of the device showing the reverse side to that shown in Figure 1, and showing the device open for applying to a tire.

Referring to the drawing, the numerals 1 and 2 designate L-shaped members, which members have their arms 3 extending towards each other and overlapped when the device is applied to the tire 4. The arms 3 are provided with outwardly extended curved plates 5 at their upper sides, which plates register with each other when the arms are moved to operative position as shown in Figure 1, and the device is applied to the tire. The plates 5 form a relatively wide bearing surface for the tread of the tire 4, thereby preventing injury of the tire during the road gripping operation. The arms 6 of the L-shaped members 1 and 2 extend inwardly in relation to the wheel at the sides of the tire 4 and curve inwardly and terminate in enlargements 7, which engage over the opposite sides of the demountable rim 8. It will be seen in operation that the device may give slightly with the tire 4, but the tire and demountable rim 8 will be gripped sufficiently to prevent circumferential movement of the gripping device during the rotation of the drive wheel.

Extending outwardly from the sides of the arms 6 adjacent their outer ends are lugs 9 and through enlarged apertures 10 therein a securing bolt 11 extends, and by means of which bolt the L-shaped members 1 and 2 may be drawn towards each other to positions where the ends 12 of the arms 3 will be received in the slots 14 and 15 of the lug 16 carried by one of the arms 6 of one of the L-shaped members and by the lug 9 of the other L-shaped member, at which time the L-shaped members will be prevented from spreading outwardly on the pivotal bolt 17 between the L-shaped members but may move inwardly at their inner ends for more thoroughly gripping the sides of the tire with their arms 6. The bolt 17 is carried by one of the arms 3 and extends through an elongated aperture in the other arm, therefore it will be seen that when the device is placed on the tire, while the device is in the position as shown in Figure 4, the arms 3 may be moved into registration with each other, and after they are in registration, upon tightening the nut 19 of the securing bolt 11, the ends 12 may be positioned in the slots 14 and 15 of the lugs 16 and 9, thereby securely locking and holding the device on the tire.

From the above it will be seen that a road gripping device is provided for automobile drive wheels which device may be easily and quickly applied to the wheel while the wheel is in the mud, thereby obviating the present difficulty of placing tire chains on drive wheels under these conditions, and it will also be seen that the device yields with the tire and the L-shaped members are positively locked together when in position on the tire, thereby insuring a uniform and nonmovable road gripping member formed from overlapping members, which members will not move in relation to each other. It will also be seen that the device is provided with a relatively wide tire engaging surface, thereby preventing damage to the tire, and at the same time insuring a large bearing surface.

The invention having been set forth what is claimed as new and useful is:—

1. The combination with an automobile tire, of a road gripping device carried thereby, said device comprising L-shaped members, one of the arms of said L-shaped members overlapping, the other arms of said L-shaped members extending inwardly to the side of the tire, and integral interengaging means between the L-shaped members.

2. The combination with an automobile tire, of a road gripping device carried thereby, said device comprising oppositely disposed L-shaped members, one of the arms of said L-shaped members overlapping, the other arms of said L-shaped members extending inwardly to the sides of the tire, the overlapped arms being provided with pin and slot connections whereby said overlapped arms may be moved longitudinally, lugs carried by the L-shaped members, and over which lugs the ends of the overlapped arms are disposed, and a transversely disposed bolt connecting said L-shaped members together.

3. The combination with an automobile tire, of a road gripping device carried thereby, said device comprising oppositely disposed L-shaped members, having one of their arms overlapped, slot and pin connections between said overlapped arms, slotted lugs carried by said L-shaped members and adapted to receive the ends of the overlapped arms, a bolt connecting said L-shaped members together, the other arms of said L-shaped members extending inwardly to the sides of the tire and forming means for preventing outward movement of the road gripping device.

4. The combination with an automobile tire, of a road gripping device carried thereby, said road gripping device comprising oppositely disposed members connected together slidably, interengaging means between said members when said members are moved towards each other, and means for moving the members towards each other and in interengagement.

5. The combination with an automobile tire, of a road gripping device carried thereby, said device comprising oppositely disposed L-shaped members having one of their arms overlapped and in registration, slidable connections between said overlapped arms, slotted lugs carried by the members and adapted to receive the ends of the overlapped arms, means for moving the members towards each other, the other arms of said L-shaped members extending inwardly to the sides of the tire and forming means for preventing outward movement of the device.

6. A road gripping device for automobile tires, said device comprising oppositely disposed L-shaped members, having one of their arms overlapped, pivoted and slot connections between the overlapped arms, interengaging means between the outer ends of the overlapped arms and portions of the adjacent L-shaped members, means for forcing and holding the L-shaped members towards each other, the other arms of the L-shaped members engaging the sides of the tire and forming means for preventing outward movement of the device.

7. A tire gripping device comprising oppositely disposed substantially L-shaped members having one of their arms pivotally and slidably connected together, interengaging means between the L-shaped members, means for forcing said L-shaped members together and into engagement, the other arms of said L-shaped members forming means for preventing outward movement of the device.

8. The combination with an automobile tire, said tire being disposed on a demountable rim, of a road gripping device carried by said tire, said device comprising oppositely disposed L-shaped members having one of their arms pivotally and slidably connected together beneath the tread of the tire, interengaging means between the ends of the pivotally connected arms and portions of the adjacent L-shaped members, means for forcing said L-shaped members towards each other, said pivotally connected arms being provided with tire tread engaging plates in registration with each other, the other arms of said L-shaped members extending inwardly to the sides of the tire and engaging over the inner side of the demountable rim.

9. A road gripping device for automobile tires, said device comprising oppositely disposed pivotally and slidably connected members adapted to grip the opposite sides of the tire, interengaging means between said members when forced towards each other, and means connecting said members for forcing the same towards each other.

In testimony whereof I affix my signature.

HENRY B. SMITH.